United States Patent Office 3,038,838
Patented June 12, 1962

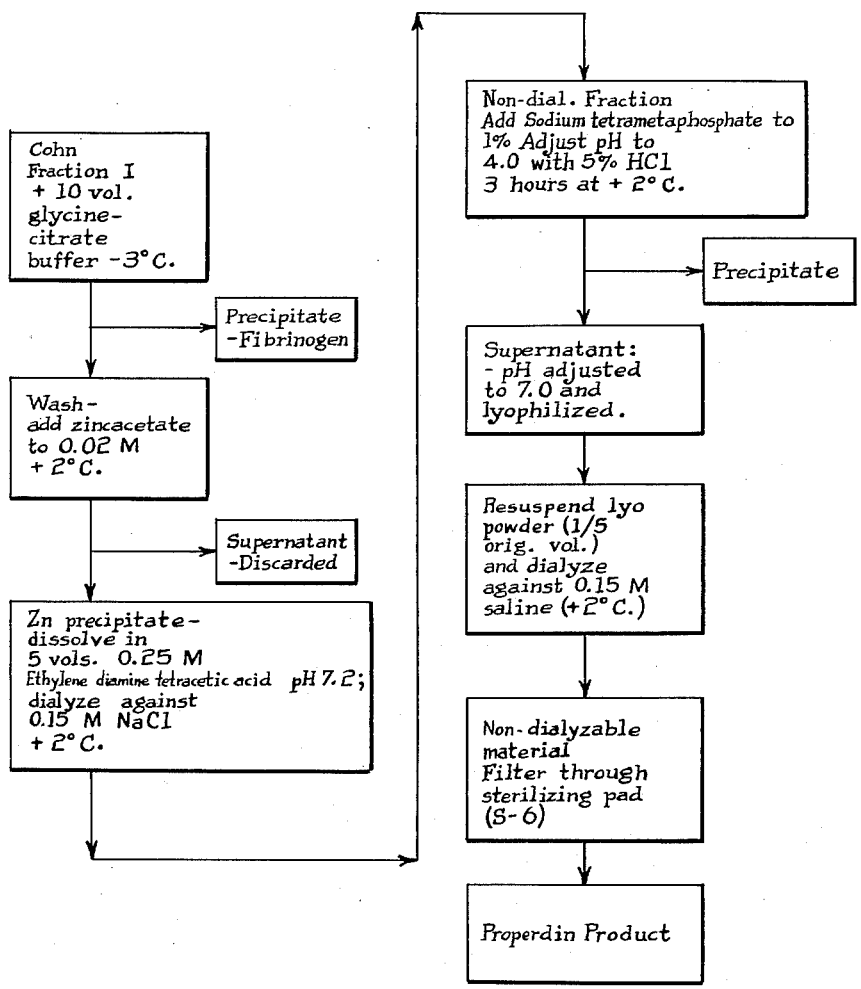

---

3,038,838
METHOD OF PRODUCING PURIFIED PROPERDIN
Daniel S. Spicer, Levittown, Edward V.C. Smith, Norwood, and Benjamin E. Sanders, North Wales, Pa., assignors to Merck & Co., Inc., Rahway, N.J., a corporation of New Jersey
Filed Nov. 20, 1958, Ser. No. 775,267
6 Claims. (Cl. 167—74)

This invention relates to a method of producing purified properdin from substances containing the same, such as human or animal fluids including whole blood and the like. The invention more particularly relates to a method of producing purified properdin from the product, derived from human or animal blood, known to those skilled in the art as Cohn fraction I. This application is a continuation-in-part of our co-pending application Serial No 698,066, filed November 22, 1957, now abandoned.

Various methods for producing purified properdin have been followed heretofore, but such methods have had limitations as to the degree of concentration and purification and the ease and rapidity with which the product may be prepared.

It is an object of this invention to provide a new and simple method for producing purified properdin. Another object of this invention is to provide a process for enriching the concentration of properdin as compared to its concentration in blood or the like, and for purifying such properdin.

Still another object of this invention is to provide a novel process which produces a superior and different properdin product.

As described by H. C. Isliker in Vox Sanguinis, vol. 1, at page 8 (published in 1956), properdin is a plasma protein which, together with other factors, accounts for the bactericidal activity of sera. It has heretofore been observed that the presence of the properdin system in the blood of humans or animals appears to have a profound bearing on the immunity of such animals to various forms of bactericidal and other activity. It has been observed, for example, that guinea pigs are very susceptible to infections, and their sera contain relatively small quantities of properdin. In contrast, the serum of the infection-resistant rat has a very high properdin content, being the highest measured among the warm blooded animals.

Properdin is normally present in the blood stream of humans, and can be mobilized by the human system. It seems to be partly responsible for imparting resistance to bacterial aggression, and the properdin system appears to be primarily a mechanism provided by nature to fulfill the defense against bacterial action during the time when antibodies have not yet been formed. Accordingly, it is an important object of this invention to provide a properdin product having greatly increased purity and concentration and in a form suitable for introduction into the serum of warm blooded animals.

It has been discovered that properdin exists in the form of several components. When properdin is removed from serum using the enzyme zymosan to absorb the properdin, the product differs from the product obtained in accordance with this invention. Accordingly, it is another object of this invention to produce properdin in a new and highly active form.

Other objects and advantages of this invention will further become apparent hereinafter.

The drawing is a flow diagram showing one form of the method in accordance with this invention.

In accordance with prior disclosures, blood plasma may be subjected to the well known Cohn cold ethanol fractionation process, following standard procedures, yielding a paste which is well known to those skilled in the art as Cohn fraction I.

The preparation of Cohn fraction I is well known in the art and is completely described in Journal of the American Chemical Society, vol. 68, at pages 459–475 (1946), Cohn, E. J. et al.

Although all of the various procedures detailed in the aforementioned article are suitable, Cohn method 6 is preferred. According to Cohn method 6, the plasma is stirred gently but thoroughly and cooled as quickly as possible to 0° C. without permitting the formation of ice. The stirring is continued while sufficient sodium acetate-acetic acid buffer in a 53.3 volume percent (at 25° C.) ethanol-water mixture is added through capillary jets to bring the pH to approximately 7.2, and the final ethanol concentration of the system to 8 percent. During the addition, the temperature is allowed to fall so that the system is maintained close to its freezing point and so that the final temperature is between −2.5 and −3° C.

The precipitate (fraction I) thereby produced according to Cohn method 6 consists principally of fibrinogen but also contains a small quantity of properdin. The fraction I precipitate is removed by centrifugation at a temperature between −2 and −3° C. If the undried fraction I is stored at −5° C. for periods longer than a few months, loss of fibrinogen occurs. Storage at lower temperatures slows but does not completely stop this loss. The fibrinogen may be preserved by dissolving in 4 volumes of sodium citrate buffer at pH 6.1 and ionic strength 0.3.

Cohn fraction I for purposes of this invention may vary in composition, depending upon the specific Cohn procedures used. Cohn et al. have reported (J. Am. Chem. Soc., 68, 466 (1946)) the following figures relative to distribution of plasma proteins in fraction I, all of which are suitable:

| Cohn Method | Albumin | αGlobulin | Cholesterol | βGlobulin | γGlobulin | Fibrinogen |
|---|---|---|---|---|---|---|
| 1 | 0.3 | 0 | 0 | 0.2 | 0.7 | 4.3 |
| 2 | 1.0 | 0.3 |  | 0.4 | 0.2 | 3.0 |
| 5 | 0.2 | 0.2 | 0.02 | 0.8 | 0.5 | 2.4 |
| 6 | 0.3 | 0.3 | .01 | 0.6 | 0.3 | 2.6 |
| Plasma | 33.2 | 8.4 | 1.6 | 7.8 | 6.6 | 4.3 |

In accordance with the method of this invention, the plasma protein mixture, preferably Cohn fraction I, is suspended in a glycine-citrate buffer at a temperature below about 0° C., and after stirring the fibrinogen is removed by low temperature centrifugation, at a temperature below about 0° C. The supernatant liquid is treated at slightly above 0° C. by adding a solution of zinc acetate to give a final concentration of approximately 0.02 M. The zinc acetate solution is preferably added slowly with vigorous stirring and the final solution is allowed to stand for approximately 18 hours. The zinc precipitate is collected by decantation and/or centrifuging.

The zinc-protein complex thereby produced is dissolved at room temperature in ethylene diamine tetraacetic acid. The zinc and ethylene diamine tetraacetic acid are then removed from the solution, preferably by dialysis, and the resulting liquid is treated by adding sodium tetrametaphosphate and then reducing the pH, thereby precipitating considerable material which then is removed by centrifugation or otherwise.

The supernatant liquid from the metaphosphate precipitation is adjusted to approximately a neutral condition and the solution is lyophilized. The lyophilized material is suspended in a small volume of water and dialyzed against sodium chloride or the like, and the dialyzed solution is clarified by centrifugation and filtered in order to produce the final sterile solution which is rich in properdin.

The following specific example illustrates in more detail a preferred method of carrying out the invention.

EXAMPLE

Preparation of Properdin From Cohn Fraction I

The Cohn cold ethanol fractionation process was applied to approximately 1400 liters of citrated plasma yielding 20 kilograms of fraction I paste (crude fibrinogen). This paste was suspended in ten volumes (200 liters) of cold (−3° C.) glycine buffer with the aid of a Waring Blendor. Preferably, this buffer has the following composition:

| | | |
|---|---|---|
| Sodium citrate · $6H_2O$ | grams | 1.91 |
| Sodium chloride | do | 13.6 |
| Sodium acetate · $3H_2O$ | do | 7.94 |
| Glycine | do | 75.07 |
| 3A Ethanol | milliliters | 73.3 |

Water to 1 liter.
Adjust to pH 6.0 with 0.4 M acetic acid.

The suspension was stirred for two hours at −3° C. and the fibrinogen removed by low temperature centrifugation (−3° C.). The supernatant liquid was stored at −3° C. for three days to precipitate some fibrinogen-like material. This was removed by centrifugation at −5° C. The precipitate was discarded.

A properdin-rich fraction was precipitated from the supernatant liquid at +2° C. by adding 1.0 molar zinc acetate to give a final concentration of approximately 0.02 M. (20 ml. 1 M zinc acetate per liter of supernatant.)

The zinc acetate solution was added slowly with vigorous stirring and the final solution allowed to stand 18 hours at +2° C. The zinc precipitate was collected by decantation of the bulk of the supernatant liquid, then centrifuging the remainder at +2° C. The yield of the zinc precipitate was 650 g.

The zinc-protein complex was dissolved at room temperature in 10 liters of 0.25 M ethylene diamine tetraacetic acid (EDTA) at pH 7.2. This was accomplished by stirring for approximately one-half hour. The zinc and EDTA were removed by dialysis against 0.15 M sodium chloride at +2° C. (Three changes of 200 liters of saline were used over a 72 hour period.) A small amount of insoluble material present after dialysis was removed by centrifugation.

The dialyzed supernatant liquid was further purified by adding 10% sodium tetrametaphosphate (100 ml. per liter) and then adding 5% hydrochloric acid until a pH of 3.5 to 4.0 was reached. Considerable material precipitated under these conditions and the solution was permitted to stand for 3 to 4 hours at +2° C. to insure completeness of precipitation. The precipitate was easily removed by centrifugation.

The supernatant liquid from the metaphosphate precipitation was adjusted to pH 7.0–7.2 with 1 M sodium bicarbonate and the solution lyophilized. The lyophilized material was suspended in 3 liters of distilled water, stirring for ½ hour at +2° C.

This suspension was dialyzed against 0.15 M NaCl at +2° C. Two changes of 100 liters of saline were used over a forty-eight hour period.

The dialyzed solution was clarified by centrifugation at +2° C. and contained 250 units of properdin per milliliter (600 units per milligram of protein nitrogen). This solution was filtered through a sterilizing pad, such as Republic No. S-6.

The final solution contained 150 units of properdin per milliliter with a specific activity of 340 units per milligram of protein nitrogen. Final volume was 4 liters.

Several other routes of obtaining properdin from the metaphosphate supernatant liquid have been tried with varying degrees of success. Precipitation with ammonium sulfate (greater than 50%) with subsequent dialysis of the resulting precipitate gave material having a specific activity of 300–400 units per mg. of protein nitrogen with yields in the neighborhood of 75% as compared with the metaphosphate supernatant. The overall purification obtained to date has been as high as 2,000 fold and above for the final product.

Properdin of a still higher purity and in a more concentrated and usable form was obtained by alcohol precipitation. This was accomplished by first adjusting the pH of the tetrametaphosphate supernatant liquid to a value of 6.8 by the addition, for example, of 1 molar sodium bicarbonate. An equal volume of cold (+2° C.) distilled water then was added and the resulting solution cooled to the freezing point. After the formation of a light slush, 50% ethanol (precooled to −20° C.) was added slowly with vigorous stirring until the final ethanol concentration reached 20% by volume. The temperature of the solution was not permitted to exceed 0° C. during the alcohol addition. The alcoholic solution then was permitted to stand for 18 hours at −5° C., after which the precipitated properdin was collected by low temperature (−5° C.) centrifugation.

Since the presence of ethanol is sometimes undesirable, the 20% alcohol precipitate may be suspended in 100 to 200 ml. of cold distilled water and lyophilized. After drying, the lyophilized powder, or in some cases the alcohol paste, was dissolved in a volume of cold saline-phosphate buffer (0.15 molar sodium chloride, 0.05 molar phosphate, pH 7.4) equivalent to 10 to 20 times the weight (v./w.) of the alcohol precipitate. This solution was then clarified by centrifugation at +2° C. and the supernatant liquid containing the properdin decanted.

Sterile properdin solutions have been prepared by filtration of this saline-phosphate solution through a sterile Republic S-6 pad. Some loss in activity has been seen although essentially no difficulties have been encountered in preparing sterile, non-toxic, pyrogen-free solutions of properdin by the methods just described.

Properdin of a still higher purity was obtained by subjecting the final solution described above, before sterile filtration, to a second treatment with sodium tetrametaphosphate followed by alcohol precipitation in identical fashion in the dialyzed EDTA solution.

Purified properdin solutions obtained from Cohn fraction I have exhibited no gross instability when stored at low temperatures (+2° C.) for several days. Frozen solutions, at (−20° C.) have maintained full potency for weeks.

Referring to the matter of toxicity, the acute intravenous lethal dose$^{50}$ in mice of one properdin preparation was found to be greater than 3000 units per kilogram of body weight. The same preparation has been given intravenously to human patients in quantities as high as 4000 units per kilogram of body weight over a two hour period with no visible sign of toxicity.

Properdin preparations produced in accordance with this invention have been found to have a specific activity, in general, which compares favorably against the preparations obtained in the laboratory by the zymosan method heretofore referred to. In the analytical ultracentrifuge, properdin isolated from fraction I in accordance with this invention revealed the presence of four components when examined in a saline-phosphate buffer at pH 7.4. It is understood in the art that native properdin is an extremely high molecular weight substance having an active sedimentation constant of approximately 24–30 S. The amount of such high molecular weight material in properdin from fraction I in accordance with this invention is very small, and preliminary preparative ultracentrifuge experiments have associated the greater portion of the activity with components 2 and 3 of the four component mixture, and having active sedimentation constant of approximately 6 S. Accordingly, it is apparent that properdin as made using the method in accordance with this invention differs substantially from the properdin heretofore produced, and the novel product in many instances has a specific activity which is greater than the prior preparations. In accordance with the method wherein the serum (not ethanol-fractionated) is subjected to a zymosan adsorption process, the properdin product has a molecular weight of at least about 1,000,000, whereas the estimated molecular weight of the product in accordance with this invention is in the range of about 85,000 to 170,000. Although the specific reasons for this large difference are not presently known, it appears quite clear that the difference is due to the overall chemical treatment which includes the combination of treating the material with zinc acetate following the use of ethanol, and prior to the application of sodium tetrametaphosphate.

The following table illustrates the properdin content of various fractions in accordance with this invention:

| Fraction | Volume and/or Weight | Properdin, Units/ml. | Properdin Units, mg. Protein N | Total Properdin Units |
|---|---|---|---|---|
| Citrated Human Plasma. | 600 l. | | | |
| Zinc Precipitate. | 358 g. | | | |
| Dialyzed EDTA Solution. | 3.38 l. | 100 | 57.2 | $3.38 \times 10^5$ |
| Sodium Tetrametaphosphate Supernatant Liquid. | 3.46 l. | 50 | 290 | $1.73 \times 10^5$ |
| 20% Alcohol Precipitate. | 10 g. (144 ml.). | 2,000 | 826 | $2.88 \times 10^5$ |

The following table shows the properdin contents produced in a second sodium tetrametaphosphate purification step in accordance with this invention:

| Fraction | Volume, ml. | Properdin, Units/ml. | Properdin, Units/mg. Protein N | Total Properdin Units |
|---|---|---|---|---|
| 20% Alcohol Precipitate. | 50.0 | 2,000 | 826 | $1 \times 10^5$ |
| Sodium tetrametaphosphate Supernatant Liquid. | 53.0 | 1,750 | 1,540 | $0.93 \times 10^5$ |
| Sodium tetrametaphosphate Precipitate. | 23.6 | 100 | 110 | $0.024 \times 10^5$ |

The following table illustrates the ultracentrifugal analysis of properdin which is produced in accordance with this invention:

| Component | $S^\circ_{20,W}$ Sedimentation Constant | Percent |
|---|---|---|
| 1 | 1.54 | 26 |
| 2, 3 | 6.0 | 70 |
| 4 | 18.1 | 4 |

Accordingly, it will be appreciated that this method is directed to the preparation of a new form of properdin from Cohn fraction I, wherein a zinc solution is utilized for precipitating a properdin-rich fraction, wherein the sodium tetrametaphosphate treatment is applied for the removal of inert proteins, and wherein the excess inorganic material is concentrated and removed. This method is much more readily carried into effect and much less expensive than methods known heretofore. It has heretofore been known that properdin is a trace protein in serum which is almost specifically absorbed by zymosan, yeast cell wall material, which is very expensive. Such isolation procedure is dependent upon the use of fresh serum or plasma which contains magnesium and various components of complement in proper concentration and under rigidly controlled temperature conditions.

As distinguished from fresh serum, the starting material for the practice of this invention is the inexpensive waste wash solution of Cohn fraction I. Properdin in this solution varies considerably with the initial concentration of the plasma from which it is derived, but even with wide variation as to this factor, a concentration of over 100 fold is readily attainable in accordance with this invention. The application of zinc as a precipitating agent provides a very substantial concentration of properdin and cooperates with the application of sodium tetrametaphosphate in the concentration process. Although it would be expected that the properdin would be precipitated throughout a rather wide range of pH changes, we have found instead that properdin is not precipitated over a range of pH from 4.2 to 3.2, but instead is found in the supernatant solution. The sodium tetrametaphosphate precipitation step may therefore be carried out in the practice of the present invention in the range from pH 4.2 to pH 3.2. A large amount of inert protein is removed by the tetrametaphosphate precipitation step, further greatly improving the purity of the properdin product.

Although the patent to Rane et al. No. 2,726,235, granted December 6, 1955, discloses the separation of plasma protein utilizing sodium tetrametaphosphate, and although this patent would seem to indicate that properdin (which is referred to in the literature as beta globulin) should be precipitated along with the other beta globulins, we have found instead that properdin remains in the supernatant solution under a rather wide range of pH conditions.

The utility of this invention will readily become apparent. The "Properdin System" has been described as being a protein which together with the four components of complement and magnesium are normally present in the serum of man and other animals. This system has the ability in vitro to lyse abnormal erythrocytes, destroy bacteria, kill protozoa, and inactivate certain viruses. This useful substance may be prepared at a drastically reduced expense by utilizing the method in accordance with this invention.

We have found that the process, as described therein, provides a solution of properdin containing several hundred properdin liter units per milliliter, and of a purity of upwards of several hundred units per milligram of protein N.

Although this invention has been disclosed with reference to the specific forms thereof, it will be understood that various equivalent forms of reactants and steps may be utilized without departing from the spirit or scope of this invention as defined in the appended claims.

Having thus described our invention, we claim:

1. In a method of producing purified and concentrated properdin from Cohn fraction I, the steps which comprise treating said fraction with a glycine citrate buffer, separating the supernatant buffer wash from the insoluble material produced, and thereafter treating the supernatant buffer wash with a zinc acetate solution until a precipitate is formed, removing the properdin containing zinc precipitate, and then recovering the purified and concentrated properdin from the zinc precipitate.

2. In a method of producing purified and concentrated properdin from Cohn fraction I, the steps which comprise suspending a given volume of said Cohn fraction I in about five to ten volumes of alcohol glycine buffer at a temperature below about 0° C., physically removing the insoluble fibrinogen from said suspension at a temperature below about 0° C., adding a zinc acetate solution, stirring until a precipitate is formed, removing the properdin containing zinc precipitate, and then recovering the purified and concentrated properdin from the zinc precipitate.

3. In a method of producing purified and concentrated properdin from Cohn fraction I, the steps which comprise treating said fraction with a glycine citrate buffer, thereby taking up properdin in said glycine citrate solution and producing insoluble fibrinogen, physically removing the insoluble fibrinogen from said suspension, adding a zinc solution to the supernatant liquid containing properdin, stirring, removing the properdin containing zinc precipitate, dissolving said zinc preciptate in ethylene diamine tetraacetic acid having a pH of about 7.2, removing the zinc and ethylene diamine tetraacetic acid by dialysis, adding sodium tetrametaphosphate to the dialyzed supernatant liquid, adding hydrochloric acid to provide a pH of about 3.2 to 4.2, removing the precipitate, adjusting the resulting supernatant liquid to a pH of about 7, lyophilizing the resulting material, dialyzing against approximately .15 molar sodium chloride and clarifying and filtering to produce the purified and concentrated properdin product.

4. In a method of producing purified and concentrated properdin from Cohn Fraction I, the steps which comprise suspending a given volume of said Cohn Fraction I in about five to ten volumes of glycine-citrate buffer comprising:

| | | |
|---|---|---|
| Sodium citrate·6H$_2$O | grams | 1.91 |
| Sodium chloride | do | 13.6 |
| Sodium acetate·3H$_2$O | do | 7.94 |
| Glycine | do | 75.07 |
| 3A ethanol | milliliter | 73.3 |
| Water to 1 liter. | | | adjusting to pH 6.0 with 0.4 M acetic acid, at a temperature below about 0° C., removing the insoluble fibrinogen from said suspension at a temperature below about 0° C., adding a zinc acetate solution of about 1 molar concentration to the supernatant liquids, stirring, removing the zinc precipitate, dissolving said zinc precipitate in ethylene diamine tetraacetic acid of approximately ¼ molar concentration and having a pH of about 7.2, removing the zinc and ethylene diamine tetraacetic acid by dialysis against approximately .15 molar sodium chloride, adding sodium tetrametaphosphate to the dialyzed supernatant liquid, adding hydrochloric acid to provide a pH of about 3½ to 4, removing the precipitate, adjusting the resulting supernatant liquid to a pH of about 7, lyophilizing the resulting material, dialyzing against approximately .15 molar sodium chloride and clarifying and filtering to produce the purified and concentrated properdin product.

5. In a method of producing purified and concentrated properdin from Cohn fraction I, the steps which comprise treating said fraction with a glycine citrate buffer, separating the insoluble fibrinogen from the supernatant buffer solution, and thereafter treating the properdin containing supernatant with a zinc acetate solution, stirring, removing the zinc precipitate, dissolving said zinc precipitate in ethylene diamine tetraacetic acid, removing the zinc and ethylene diamine tetraacetic acid, adding sodium tetrametaphosphate, removing the resulting precipitate, adjusting the pH of the supernatant liquid to about 6.8, adding cold ethanol and collecting the resulting precipitated properdin.

6. The method defined in claim 5 wherein the properdin precipitate produced is lyophilized, dissolved in cold saline-phosphate buffer, and the resulting precipitate separated from the supernatant liquid containing the properdin.

References Cited in the file of this patent
UNITED STATES PATENTS

| | | |
|---|---|---|
| 2,726,235 | Rane | Dec. 6, 1955 |
| 2,822,315 | Cohn | Feb. 4, 1958 |

OTHER REFERENCES

Tullis, pages 29–30, Blood and Plasma Proteins Their State in Nature, pub. by Academic Press, Inc., 1953.
Cohn: J.A.C.S., vol. 68, pp. 459–475, March 1946.
Cohn: J.A.C.S., vol. 72, pp. 465–474, January 1952.
Tullis: Blood Cells and Plasma Proteins, Academic Press, Inc., N.Y., 1953, pp. 36–38, esp. p. 38.
Cohn: Proc. Amer. Philosophical Soc., vol. 88, September 1944, pp. 159–173, esp. 167.